United States Patent
Lyons et al.

(10) Patent No.: US 8,377,510 B2
(45) Date of Patent: Feb. 19, 2013

(54) METHODS OF FORMING HARDFACING MATERIALS INCLUDING PCD PARTICLES, AND WELDING RODS INCLUDING SUCH PCD PARTICLES

(75) Inventors: Nicholas J. Lyons, Houston, TX (US); Danny E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/297,040

(22) Filed: Nov. 15, 2011

(65) Prior Publication Data
US 2012/0056022 A1    Mar. 8, 2012

Related U.S. Application Data

(62) Division of application No. 12/497,420, filed on Jul. 2, 2009, now Pat. No. 8,079,428.

(51) Int. Cl.
*C23C 16/27* (2006.01)
(52) U.S. Cl. .......... 427/249.8; 427/255.7; 427/348; 427/355
(58) Field of Classification Search .......... 427/249.8, 427/255.7, 348, 355
See application file for complete search history.

(56) References Cited

U.S. PATENT DOCUMENTS

| | | | |
|---|---|---|---|
| 3,913,280 A * | 10/1975 | Hall | 51/307 |
| 4,224,380 A | 9/1980 | Bovenkerk et al. | |
| 4,726,432 A | 2/1988 | Scott et al. | |
| 4,872,520 A | 10/1989 | Nelson | |
| 4,907,377 A * | 3/1990 | Csillag et al. | 51/309 |
| 5,096,465 A * | 3/1992 | Chen et al. | 51/295 |
| 5,127,923 A | 7/1992 | Bunting et al. | |
| 5,174,374 A | 12/1992 | Hailey | |
| 5,174,974 A | 12/1992 | Birbara et al. | |
| 5,248,006 A | 9/1993 | Scott | |
| 5,351,769 A | 10/1994 | Scott et al. | |
| 5,364,423 A * | 11/1994 | Bigelow et al. | 51/293 |
| 5,445,231 A | 8/1995 | Scott et al. | |
| 5,641,921 A | 6/1997 | Dennis et al. | |
| 5,663,512 A | 9/1997 | Schader et al. | |
| 5,755,298 A | 5/1998 | Langford | |
| 5,755,299 A | 5/1998 | Langford | |
| 5,775,298 A | 7/1998 | Haller | |
| 5,775,299 A | 7/1998 | Ito et al. | |
| 5,855,247 A | 1/1999 | Scott et al. | |
| 6,124,564 A | 9/2000 | Sue et al. | |
| 6,173,797 B1 | 1/2001 | Dykstra et al. | |
| RE37,127 E | 4/2001 | Schader et al. | |
| 6,408,958 B1 | 6/2002 | Isbell et al. | |
| 6,684,966 B2 | 2/2004 | Lin et al. | |
| 6,830,598 B1 | 12/2004 | Sung | |
| 6,843,333 B2 | 1/2005 | Richert et al. | |

(Continued)

FOREIGN PATENT DOCUMENTS

WO    WO 00/28106    *   5/2000

OTHER PUBLICATIONS

Sumiya, H., et al., "Microstructure features of polycrystalline diamond synthesized directly from graphite under static high pressure." Journal of Materials Science 39 (2004) pp. 445-450.*

(Continued)

*Primary Examiner* — Bret Chen
(74) *Attorney, Agent, or Firm* — TraskBritt

(57) ABSTRACT

Methods of forming a hardfacing material include subjecting diamond grains to elevated temperatures and pressures to form diamond-to-diamond bonds between the diamond grains and form a PCD material. The PCD material is broken down to form PCD particles that include a plurality of interbonded diamond grains.

15 Claims, 6 Drawing Sheets

U.S. PATENT DOCUMENTS

| | | | |
|---|---|---|---|
| 6,872,356 | B2 | 3/2005 | Butcher et al. |
| 7,261,752 | B2 | 8/2007 | Sung |
| 7,350,599 | B2 | 4/2008 | Lockwood et al. |
| 7,367,875 | B2 * | 5/2008 | Slutz et al. .................. 451/443 |
| 7,458,765 | B2 | 12/2008 | Stiles et al. |
| 7,497,280 | B2 | 3/2009 | Brackin et al. |
| 2003/0024351 | A1 | 2/2003 | Pender et al. |
| 2003/0110707 | A1 * | 6/2003 | Rosenflanz et al. ............ 51/307 |
| 2004/0025443 | A1 | 2/2004 | Davies |
| 2005/0247491 | A1 | 11/2005 | Mirchandani et al. |
| 2006/0162967 | A1 | 7/2006 | Brackin et al. |
| 2006/0236616 | A1 * | 10/2006 | Wan .............................. 51/309 |
| 2007/0193782 | A1 | 8/2007 | Fang et al. |
| 2008/0023231 | A1 * | 1/2008 | Vail .............................. 175/434 |
| 2008/0083568 | A1 * | 4/2008 | Overstreet et al. ............ 175/425 |
| 2008/0115421 | A1 * | 5/2008 | Sani .............................. 51/295 |
| 2008/0179108 | A1 | 7/2008 | McClain et al. |
| 2008/0264696 | A1 | 10/2008 | Dourfaye et al. |
| 2008/0283305 | A1 | 11/2008 | Overstreet et al. |
| 2010/0101866 | A1 | 4/2010 | Bird |

OTHER PUBLICATIONS

Sumiya, Hitoshi, et al., "Synthesis of High-Purity Nano-Polycrystalline Diamond and Its Characterization". SEI Technical Review, No. 59, Jan. 2005, pp. 52-59.*

International Search Report for International Application No. PCT/US2010/040860 mailed Feb. 9, 2011, 3 pages.

International Written Opinion for International Application No. PCT/US2010/040860 mailed Feb. 9, 2011, 3 pages.

International Preliminary Report on Patentability for International Application No. PCT/US2010/040860, 4 pages.

* cited by examiner

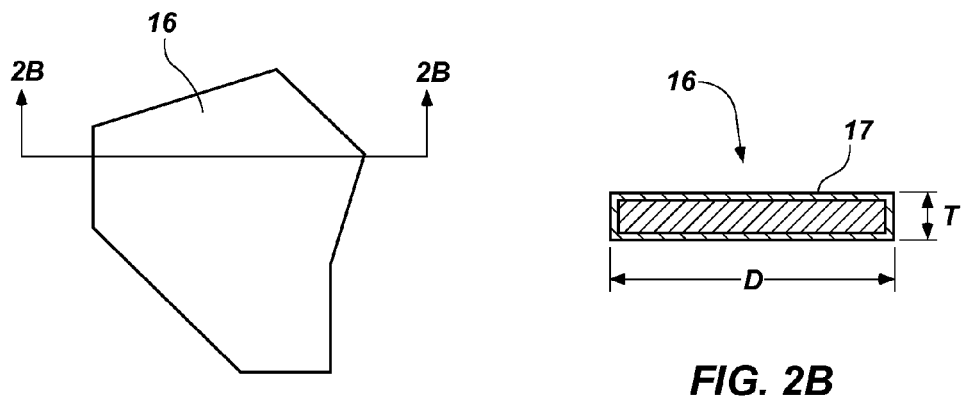
FIG. 2A
FIG. 2B
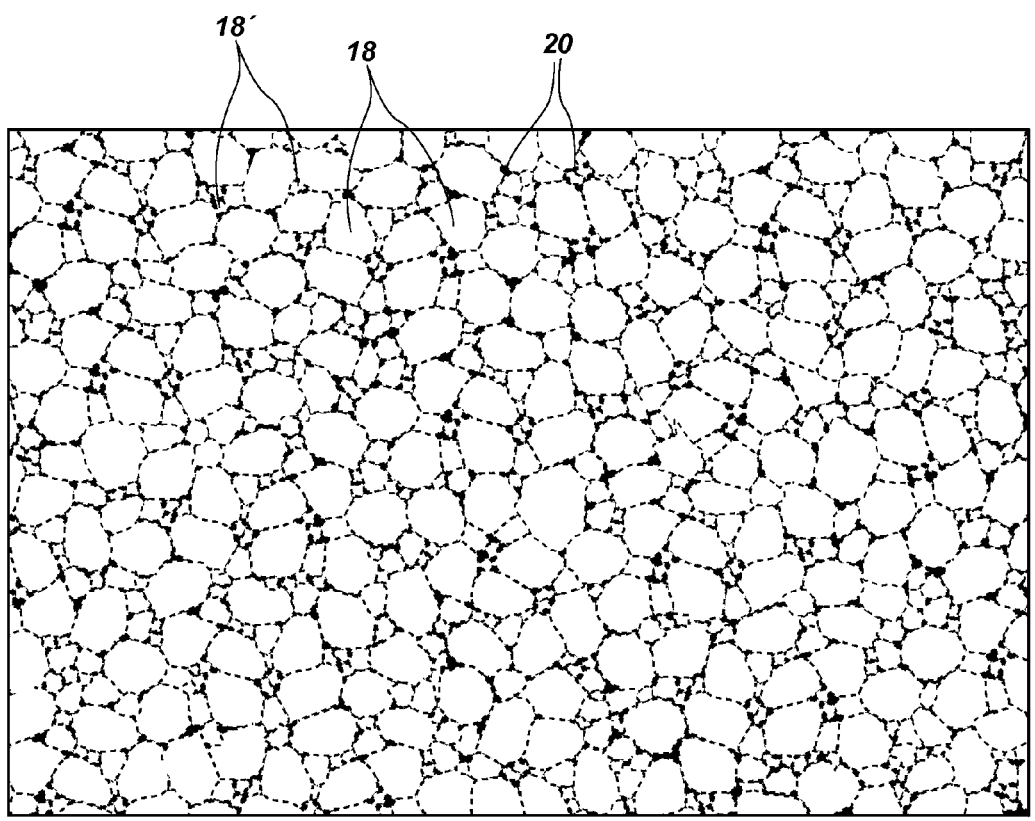
FIG. 2C

METHODS OF FORMING HARDFACING MATERIALS INCLUDING PCD PARTICLES, AND WELDING RODS INCLUDING SUCH PCD PARTICLES

CROSS-REFERENCE TO RELATED APPLICATION

This application is a divisional of U.S. patent application Ser. No. 12/497,420, filed Jul. 2, 2009, now U.S. Pat. No. 8,079,428, issued Dec. 20, 2011, the disclosure of which is hereby incorporated herein by this reference in its entirety.

TECHNICAL FIELD

Embodiments of the present invention relate to materials that may be used to increase the wear-resistance of earth-boring tools and components of earth-boring tools used in the formation of wellbores, and to methods of forming and using such materials, tools, and components.

BACKGROUND

Wellbores are formed in subterranean formations for various purposes including, for example, extraction of oil and gas from subterranean formations and extraction of geothermal heat from subterranean formations. A wellbore may be formed in a subterranean formation using an earth-boring rotary drill bit. Different types of earth-boring rotary drill bits are known in the art including, for example, fixed-cutter drill bits (which are often referred to in the art as "drag" bits), roller cone drill bits (which are often referred to in the art as "rock" bits), diamond-impregnated bits, and hybrid bits (which may include, for example, both fixed cutters and roller cone cutters). The drill bit is rotated under an applied axial force, termed "weight-on-bit" (WOB) in the art, and advanced into the subterranean formation. As the drill bit rotates, the cutters or abrasive structures thereof cut, crush, shear, and/or abrade away the formation material to form the wellbore.

The drill bit is coupled, either directly or indirectly, to an end of what is referred to in the art as a "drill string," which comprises a series of elongated tubular segments connected end-to-end that extends into the wellbore from the surface of the formation. Various tools and components, including the drill bit, may be coupled together at the distal end of the drill string at the bottom of the wellbore being drilled. This assembly of tools and components is referred to in the art as a "bottom-hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is coupled. The shaft of the motor is rotated by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

The materials of earth-boring tools need to be relatively hard and wear-resistant to efficiently remove formation material within a wellbore without undergoing excessive wear. Due to the extreme forces and stresses to which drill bits and other earth-boring tools are subjected during drilling and reaming operations, the materials of earth-boring tools must simultaneously exhibit relatively high fracture toughness. Materials that exhibit extremely high hardness, however, tend to be relatively brittle and do not exhibit high fracture toughness, while materials that exhibit high fracture toughness tend to be relatively soft and do not exhibit high hardness. As a result, a compromise must be made between hardness and fracture toughness when selecting materials for use in drill bits.

In an effort to simultaneously improve both the hardness and fracture toughness of earth-boring drill bits, composite materials have been applied to the surfaces of drill bits that are subjected to abrasion, erosion, or to both abrasion and erosion. These composite materials are often referred to as "hardfacing" materials. Hardfacing materials typically include at least one phase that exhibits relatively high hardness and another phase that exhibits relatively high fracture toughness.

For example, hardfacing materials often include tungsten carbide particles dispersed throughout a metal or metal alloy matrix material. The tungsten carbide particles are relatively hard compared to the matrix material, and the matrix material is relatively tough compared to the tungsten carbide particles.

Tungsten carbide particles used in hardfacing materials may comprise one or more of cast tungsten carbide particles, sintered tungsten carbide particles, and macrocrystalline tungsten carbide particles. The tungsten carbide system includes two stoichiometric compounds, WC and $W_2C$, with a continuous range of compositions therebetween. Cast tungsten carbide generally includes a eutectic mixture of the WC and $W_2C$ compounds. Sintered tungsten carbide particles include relatively smaller particles of WC bonded together by a matrix material. Cobalt and cobalt alloys are often used as matrix materials in sintered tungsten carbide particles. Sintered tungsten carbide particles can be formed by mixing together a first powder that includes the relatively smaller tungsten carbide particles and a second powder that includes cobalt particles. The powder mixture is formed in a "green" state. The green powder mixture then is sintered at a temperature near the melting temperature of the cobalt particles to form a matrix of cobalt material surrounding the tungsten carbide particles to form particles of sintered tungsten carbide. Finally, macrocrystalline tungsten carbide particles generally consist of single crystals of WC.

Various techniques known in the art may be used to apply a hardfacing material to a surface of an earth-boring tool. For example, automated and manual welding processes may be used to apply hardfacing material to an earth-boring tool. In some manual processes, a welding rod that comprises the hardfacing material is provided, and a torch (e.g., an oxyacetylene torch or an arc-welding torch) is used to heat an end of the rod and, optionally, the surface of the tool to which the hardfacing is to be applied. The end of the rod is heated until at least the matrix material begins to melt. As the matrix material at the end of the rod begins to melt, the melting hardfacing material is applied to the surface of the tool. The hard particles dispersed within the matrix material are also applied to the surface with the molten matrix material. After application, the molten matrix material is allowed to cool and solidify.

Such welding rods may comprise a substantially solid, cast rod of the hardfacing material, or they may comprise a hollow, cylindrical tube formed from the matrix material of the hardfacing material and filled with hard particles (e.g., tungsten carbide particles). In welding rods of the tubular configuration, at least one end of the hollow, cylindrical tube may be sealed. The sealed end of the tube then may be melted or welded onto the desired surface on the earth-boring tool. As the tube melts, the tungsten carbide particles within the hollow, cylindrical tube mix with the molten matrix material as it is deposited onto the surface of the tool. An alternative technique involves forming a cast rod of the hardfacing material.

Flame spray processes are also used to apply hardfacing materials to earth-boring tools. In a flame spray process, a powder comprising the hard particles and particles of the matrix material is carried by a pressurized fluid (e.g., a pressurized gas) to a nozzle. The powder mixture is sprayed out from the nozzle and through a flame toward the surface of the tool to which the hardfacing is to be applied. The flame causes the particles of matrix material to at least partially melt. As the material is sprayed onto the tool, the molten matrix material cools and solidifies, and the hard particles become embedded in the matrix material to form the hardfacing on the surface of the tool.

Various types of arc welding processes are known in the art and may be used to apply hardfacing to a surface of an earth-boring tool. For example, metal-inert gas (MIG) welding processes, tungsten-inert gas (TIG) welding processes, and plasma-transferred arc (PTA) welding processes may be used to apply hardfacing to a surface of an earth-boring tool.

There remains a need in the art for abrasive, wear-resistant hardfacing materials that exhibit improved resistance to abrasion, erosion, or both abrasion and erosion.

BRIEF SUMMARY OF THE INVENTION

In some embodiments, the present invention includes hardfacing materials comprising particles of polycrystalline diamond material embedded within a matrix material. The particles of polycrystalline diamond material comprise a plurality of inter-bonded diamond grains.

In additional embodiments, the present invention includes material compositions and structures, such as welding rods, that may be used to apply a hardfacing material to a surface of an earth-boring tool. The material compositions and structures include particles of polycrystalline diamond material comprising a plurality of inter-bonded diamond grains. For example, a welding rod may comprise an elongated, generally cylindrical body comprising a metal matrix material, and particles of polycrystalline diamond material carried by the elongated, generally cylindrical body.

In additional embodiments, the present invention includes earth-boring tools that include a body, at least one cutting element on the body, and a hardfacing material on at least a portion of a surface of the body. The hardfacing material includes particles of polycrystalline diamond material embedded within a matrix material. The particles of polycrystalline diamond material include a plurality of inter-bonded diamond grains.

In further embodiments, the present invention includes methods of foil ling a hardfacing material in which diamond grains are subjected to a temperature greater than about 1,500° C. and a pressure greater than about 5.0 gigapascals (GPa) to form diamond-to-diamond bonds between the diamond grains and form a polycrystalline diamond material. The polycrystalline diamond material is broken down to form particles of polycrystalline diamond material that include a plurality of inter-bonded diamond grains.

Yet further embodiments of the present invention include methods of hardfacing an earth-boring tool in which particles of polycrystalline diamond material that include a plurality of inter-bonded diamond grains are bonded to a surface of an earth-boring tool using a metal matrix material.

BRIEF DESCRIPTION OF THE DRAWINGS

While the specification concludes with claims particularly pointing out and distinctly claiming that which is regarded as the present invention, various features and advantages of embodiments of this invention may be more readily ascertained from the following description of some embodiments of the invention when read in conjunction with the accompanying drawings, in which:

FIG. 2A is a simplified drawing of a hard particle of the hardfacing material of FIG. 1 that includes polycrystalline diamond material;

FIG. 2B is a cross-sectional view of the hard particle shown in FIG. 2A taken along section line 2B-2B therein;

FIG. 2C is a simplified sketch showing how the hard particle of FIGS. 2A and 2B may appear under magnification, and illustrates a plurality of inter-bonded diamond grains;

DETAILED DESCRIPTION

The illustrations presented herein are not actual views of any particular drilling system, drilling tool assembly, or component of such an assembly, but are merely idealized representations which are employed to describe the present invention.

As used herein, the term "polycrystalline diamond material" means and includes a volume of material that includes two or more grains (also referred to in the art as "crystals") bonded directly to one another at least partially by diamond-to-diamond bonds. In other words, polycrystalline diamond material is a material that includes two or more inter-bonded diamond grains.

As used herein, the term "inter-bonded diamond grains" means grains that are directly bonded to one another at least partially by diamond-to-diamond bonds.

Figure 1:
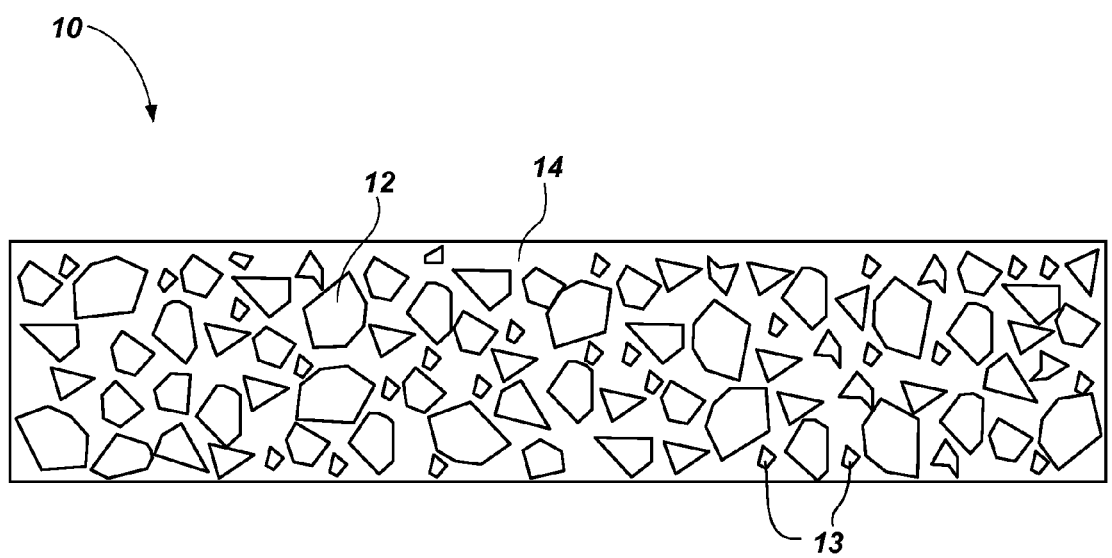
FIG. 1 is a simplified drawing of an embodiment of a hardfacing material of the present invention.

FIG. 1 is a simplified drawing illustrating an embodiment of a hardfacing material 10 of the present invention. The hardfacing material 10 comprises a composite material that includes a discontinuous or "dispersed" phase 12 embedded within and dispersed throughout a continuous matrix phase 14. The discontinuous phase 12 exhibits a hardness higher than a hardness exhibited by the matrix phase 14, and the matrix phase 14 exhibits a fracture toughness higher than a fracture toughness exhibited by the discontinuous phase 12.

The matrix phase 14 of the hardfacing material 10 may comprise a metal or metal alloy. By way of example and not limitation, the matrix phase 14 may comprise cobalt-based, iron-based, nickel-based, iron- and nickel-based, cobalt- and nickel-based, iron- and cobalt-based, copper-based, and titanium-based alloys. The matrix phase 14 may also be selected from commercially pure elements such as cobalt, iron, nickel, copper, and titanium. In some embodiments, the matrix phase 14 may comprise a matrix or "binder" material having a melting point below about 1,350° C., as disclosed in U.S. Patent Application Publication No. 2005/0247491 A1, filed Apr. 28, 2005, and entitled "Earth-Boring Bits," the entire disclosure of which is incorporated herein in its entirety by this reference.

The discontinuous phase 12 may comprise finite spatial volumes of polycrystalline diamond material that are dispersed throughout and embedded within the matrix phase 14. In some embodiments, the finite spatial volumes of the discontinuous phase 12 may be formed from and comprise particles of polycrystalline diamond (PCD) material, which are hereinafter referred to as PCD particles.

The hardfacing material 10 optionally may also comprise an additional discontinuous phase 13 that includes at least one of a carbide material (e.g., tungsten carbide, titanium carbide, tantalum carbide, silicon carbide, etc.), a boride material (e.g., titanium boride), a nitride material (e.g., silicon nitride), and non-polycrystalline diamond grit.

The hardfacing material 10 may be applied to surfaces of earth-boring tools using various methods. For example, automated and manual welding processes may be used to apply hardfacing material 10 to a surface of an earth-boring tool. Various types of arc welding processes may be used to apply hardfacing material 10 to a surface of an earth-boring tool. For example, metal-inert gas (MIG) welding processes, tungsten-inert gas (TIG) welding processes, and plasma-transferred arc (PTA) welding processes may be used to apply hardfacing material 10 to a surface of an earth-boring tool. Flame spray processes also may be used to apply hardfacing material 10 to surfaces of earth-boring tools.

FIGS. 2A-2C illustrate an example of a PCD particle 16 that may be used in accordance with embodiments of the present invention to form the discontinuous phase 12 of the hardfacing material 10 of FIG. 1.

Referring to FIG. 2A, the PCD particles 16 used to form the hardfacing material 10 (FIG. 1) may have irregular rough and jagged shapes in some embodiments of the present invention. In other words, the PCD particles 16 may comprise relatively sharp edges and corners. In additional embodiments of the present invention, the PCD particles 16 may be relatively smooth and rounded. Relatively rough and jagged PCD particles 16 may be processed to form relatively smooth and rounded PCD particles using processes known in the art, such as, for example, tumbling processes, jet blending processes, and etching processes. Depending on the particular application for which the hardfacing material 10 (FIG. 1) is to be used, either relatively rough and jagged PCD particles 16, as shown in FIG. 2A, or relatively smooth and rounded PCD particles may exhibit more desirable physical characteristics and performance.

FIG. 2B is a cross-sectional view of the PCD particle 16 of FIG. 2A taken along section line 2B-2B therein. As shown in FIG. 2B, in some embodiments of the present invention, the PCD particles 16 used to form the discontinuous phase 12 of the hardfacing material 10 (FIG. 1) may be at least substantially planar. In other embodiments, however, the PCD particles 16 may not be planar, and may be generally spherical, cubical, etc.

In embodiments in which the PCD particles 16 are at least substantially planar as shown in FIGS. 2A and 2B, the PCD particles 16 may have an average particle diameter D of, for example, between about 0.25 millimeter and about 7.0 millimeters, and an average thickness T of, for example, between about 0.1 millimeter and about 5.0 millimeters.

As shown in FIG. 2B, in some embodiments, the PCD particles 16 may be at least partially encapsulated with a coating 17 prior to forming a hardfacing material 10 using the PCD particles 16. The coating 17 may be used to protect the polycrystalline diamond material within the PCD particles 16 against thermal degradation (e.g., graphitization) that might occur during formation of a hardfacing material 10 using the PCD particles 16. By way of example and not limitation, the coating 17 may comprise a powder material comprising particles of a metal or metal alloy material that does not serve as a catalyst material for catalyzing the formation of diamond-to-diamond bonds at elevated temperatures and pressures, as described in further detail below. Such catalyst materials may, conversely, contribute to the thermal degradation of diamond material when the diamond material and the catalyst are heated to relatively lower temperatures and pressures. For example, the coating 17 may comprise particles of tungsten metal or a tungsten metal alloy. The coating 17 also may comprise particles of at least one of a carbide material (e.g., tungsten carbide, titanium carbide, tantalum carbide, silicon carbide, etc.), a boride material (e.g., titanium boride), a nitride material (e.g., silicon nitride), and non-polycrystalline diamond grit. Such a powder coating 17 optionally may be subjected to a sintering process to at least partially sinter particles within the powder coating 17. By way of non-limiting example, the PCD particles 16 may be coated using methods such as those disclosed in U.S. Pat. No. 7,350,599, which issued Apr. 1, 2008 to Lockwood et al., the entire disclosure of which is incorporated herein by this reference.

In additional embodiments, the coating 17 may comprise a layer of one or more of the above-mentioned coating materials deposited by, for example, using a physical vapor deposition (PVD) process or a chemical vapor deposition (CVD) process.

As previously mentioned, the PCD particles 16 may comprise a plurality of inter-bonded diamond grains. FIG. 2C is a simplified drawing illustrating how the microstructure of the PCD particles 16 may appear at a magnification of between about 500 times and about 1,500 times.

FIG. 2C illustrates a plurality of inter-bonded diamond grains 18, 18'. The diamond grains 18, 18' may have an average particle size within a range extending from about five microns (5.0 μm) to about thirty microns (30.0 μm). In some embodiments, the diamond grains 18, 18' may have a multi-modal grain size distribution. In other words, the diamond grains 18, 18' may comprise a mixture of two, three, or even more different sizes of grains. For example, in the embodiment of FIG. 2C, the inter-bonded diamond grains 18, 18' include both larger diamond grains 18 and smaller diamond grains 18'. The larger and smaller diamond grains 18, 18' are bonded together by diamond-to-diamond bonds at grain boundaries between the diamond grains 18, 18' (the grain boundaries being represented in FIG. 2C by dashed lines) to form the polycrystalline diamond material of the PCD particles 16. In some embodiments, interstitial spaces 20 (shaded black in FIG. 2C) between the inter-bonded diamond grains 18, 18' may be filled with a catalyst material used to catalyze formation of the diamond-to-diamond bonds between the diamond grains 18, 18'. In other embodiments, however, catalyst material may be removed from the interstitial spaces 20 between the inter-bonded diamond grains 18, 18' such that the interstitial spaces 20 comprise voids, as discussed in further detail herein below. In such embodiments, the polycrystalline diamond material of the PCD particles 16 may be porous, and a majority of the pores within the PCD particles 16 may form a continuous open pore network within the polycrystalline diamond material.

In some embodiments of the present invention, PCD particles 16 used in the hardfacing material 10 (FIG. 1) may be formed by breaking down (e.g., crushing, milling, grinding, etc.) a relatively larger volume of polycrystalline diamond material. By way of example and not limitation, the PCD particles 16 may be formed by breaking down a layer of polycrystalline diamond material of a cutting element, which previously may have been disposed on a substrate. Thus, the PCD particles 16 may comprise fragments of a layer of polycrystalline diamond material. In some embodiments, such fragments may be at least substantially planar.

Figure 3:
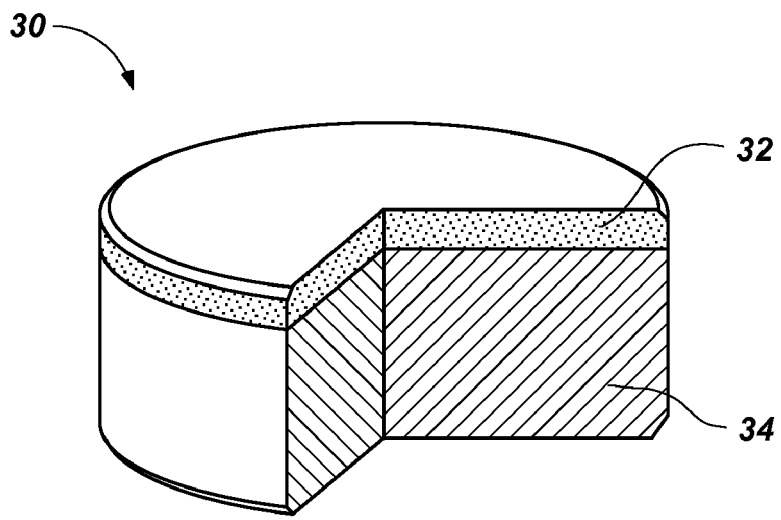
FIG. 3 is a partially cut-away view of a cutting element that includes a layer of polycrystalline diamond material that may be used to form hard particles like that shown in FIGS. 2A-2C.

FIG. 3 illustrates a cutting element 30 like those often used on drill bits and reamers used to form wellbores in subterranean formations. The cutting element 30 shown in FIG. 3 includes a volume of polycrystalline diamond material 32 bonded to a substrate 34. The volume of polycrystalline diamond material 32 is often referred to in the art as a "diamond table." The volume of polycrystalline diamond material 32 may be formed on the substrate 34, or the volume of polycrystalline diamond material 32 may be formed separately from the substrate 34 and subsequently attached to the substrate 34. As known in the art, polycrystalline diamond material may be formed by subjecting diamond grains to elevated temperatures and pressures to form diamond-to-diamond bonds between the diamond grains. For example, polycrystalline diamond material may be formed by subjecting diamond grains to temperatures greater than about 1,500° C. and pressures greater than about 5.0 GPa in the presence of a catalyst material such as, for example, cobalt for a time of between about ten seconds and several minutes. The catalyst is used to catalyze formation of the diamond-to-diamond bonds between the diamond grains. Other suitable catalysts are also known in the art. If the temperatures and pressures are sufficiently high (e.g., at a temperature greater than about 3,000° C. and a pressure greater than about 13.0 GPa), diamond-to-diamond bonds may form even in the absence of a catalyst.

Figure 4:
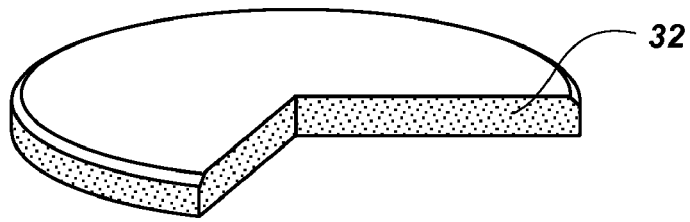
FIG. 4 is a partially cut-away view of the layer of polycrystalline diamond material shown in FIG. 3 removed from a substrate on which the layer was previously disposed.

Referring to FIG. 4, the volume of polycrystalline diamond material 32 may be removed from the substrate 34 of the cutting element 30. The volume of polycrystalline diamond material 32 may be removed from the substrate 34 using, for example, a wire Electrical Discharge Machining (EDM) process. Other processes, such as grinding processes, etching processes, or fracturing processes, also may be used to separate the volume of polycrystalline diamond material 32 and the substrate 34. After removing the volume of polycrystalline diamond material 32 from the substrate 34, the volume of polycrystalline diamond material 32 may be broken down to form a plurality of PCD particles 16 (FIGS. 2A-2C) therefrom.

Thus, some embodiments of methods of the present invention include forming a plurality of PCD particles 16 from a volume of polycrystalline diamond material 32 that was previously part of a cutting element 30. As a result, in accordance with some embodiments of the present invention, cutting elements 30 (which may or may not have been previously used in drilling or reaming a wellbore) that would otherwise be discarded may be salvaged and recycled by using the cutting elements 30 to form PCD particles 16 (FIGS. 2A-2C) for use in a hardfacing material 10 (FIG. 1). In additional embodiments of methods of the present invention, a volume of polycrystalline diamond material 32 may be formed with the intention of subsequently breaking down the volume of polycrystalline diamond material 32 to form PCD particles 16 (FIGS. 2A-2C) for use in a hardfacing material 10 (FIG. 1).

After forming the PCD particles 16, the PCD particles 16 may optionally be subjected to a leaching process to remove catalyst material from interstitial spaces 20 between the inter-bonded diamond grains 18. By way of example and not limitation, the PCD particles 16 may be leached using a leaching agent and process such as those described more fully in, for example, U.S. Pat. No. 5,127,923 to Bunting et al. (issued Jul. 7, 1992), and U.S. Pat. No. 4,224,380 to Bovenkerk et al. (issued Sep. 23, 1980), the disclosure of each of which is incorporated herein in its entirety by this reference. Specifically, aqua regia (a mixture of concentrated nitric acid ($HNO_3$) and concentrated hydrochloric acid (HCl)) may be used to at least substantially remove catalyst material from the interstitial spaces 20 between the inter-bonded diamond grains 18 in the PCD particles 16. It is also known to use boiling hydrochloric acid (HCl) and boiling hydrofluoric acid (HF) as leaching agents. One particularly suitable leaching agent is hydrochloric acid (HCl) at a temperature of above 110° C., which may be provided in contact with the PCD particles 16 for a period of about two hours to about 60 hours, depending upon the size of the PCD particles 16. After leaching the PCD particles 16, the interstitial spaces 20 between the plurality of inter-bonded diamond grains 18 within the PCD particles 16 may be at least substantially free of catalyst material used to catalyze formation of diamond-to-diamond bonds between the plurality of inter-bonded diamond grains 18.

Additional embodiments of the present invention include material compositions and structures that may be used to form a hardfacing material 10 on an earth-boring tool. Such material compositions and structures also include PCD particles (such as the PCD particles 16 as previously described with reference to FIGS. 2A-2C), and may include a matrix material used to form a matrix phase 14 of hardfacing material 10. By way of example and not limitation, the PCD particles 16 may be incorporated into a welding rod, and the welding rod may be used to deposit hardfacing material 10 on a surface of an earth-boring tool.

Figure 5:
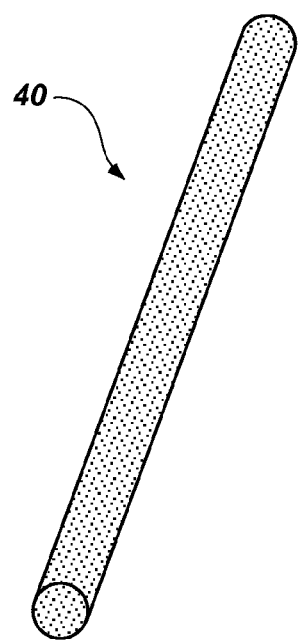
FIG. 5 is a perspective view of an embodiment of a welding rod of the present invention that includes hard particles like that shown in FIGS. 2A-2C.

FIG. 5 is a simplified perspective view of an embodiment of a solid welding rod 40 of the present invention. The solid welding rod 40 shown in FIG. 5 may comprise an at least substantially solid cylinder that includes PCD particles 16 embedded within a matrix material that will ultimately form the matrix phase 14 of the hardfacing material 10 (FIG. 1). Thus, the solid welding rod 40 includes an elongated, generally cylindrical body comprising the matrix material, and the PCD particles 16 are carried by the body. As the matrix material of the welding rod 40 will ultimately form the matrix phase 14 of the hardfacing material 10, the matrix material of the welding rod 40 may have a material composition as previously described for the matrix phase 14 of the hardfacing material 10 of FIG. 1. The solid welding rod 40 may further comprise additional hard particles that include at least one of a carbide material (e.g., tungsten carbide, titanium carbide, tantalum carbide, silicon carbide, etc.), a boride material (e.g., titanium boride), a nitride material (e.g., silicon nitride), and non-polycrystalline diamond grit. The solid welding rod 40 of FIG. 5 may be formed using, for example, a forging process, a casting process, or an extrusion process.

Figure 6A:
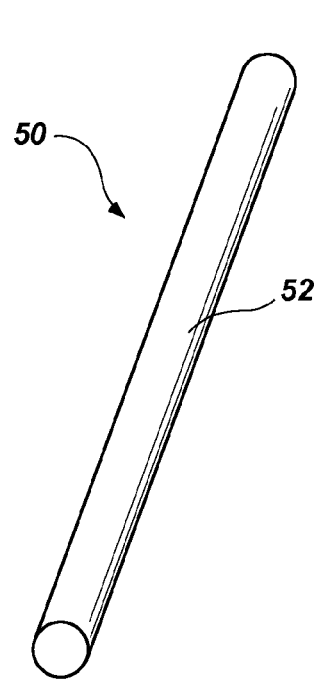
FIG. 6A is a perspective view of another embodiment of a welding rod of the present invention that includes hard particles like that shown in FIGS. 2A-2C.
Figure 6B:
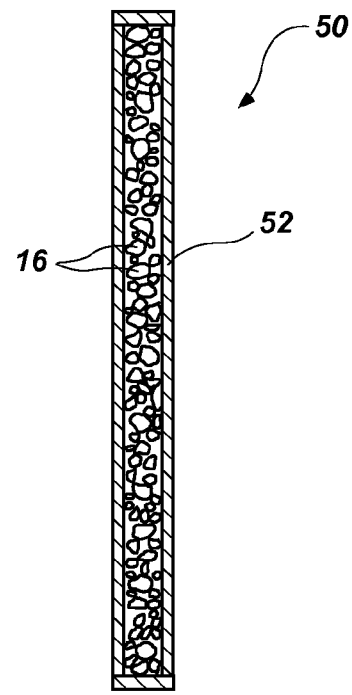
FIG. 6B is a longitudinal cross-sectional view of the welding rod shown in FIG. 6A.

FIG. 6A is a simplified perspective view of another embodiment of a tubular welding rod 50 of the present invention. The tubular welding rod 50 shown in FIG. 6A may comprise a generally hollow, cylindrical tube 52 that is at least substantially comprised by a metal or metal alloy that will be used to form the matrix phase 14 of the hardfacing material 10 (FIG. 1). Thus, the matrix material of the welding rod 50 may have a material composition as previously described for the matrix phase 14 of the hardfacing material 10 of FIG. 1. FIG. 6B is a longitudinal cross-sectional view of the tubular welding rod 50 of FIG. 6A. As shown in FIG. 6B, the interior space within the hollow, cylindrical tube 52 may be filled with PCD particles 16. The tube 52 may also contain additional hard particles that include at least one of a carbide material (e.g., tungsten carbide, titanium carbide, tantalum carbide, silicon carbide, etc.), a boride material (e.g., titanium boride), a nitride material (e.g., silicon nitride), and non-polycrystalline diamond grit. One or both ends of the tube 52 may be capped, crimped, or otherwise sealed to prevent the PCD particles 16 (and any other hard particles therein) from falling out from the tube 52. Thus, the tubular welding rod 50 also includes an elongated, generally cylindrical tubular body comprising a matrix material (i.e., tube 52), and the PCD particles 16 are carried by the body. The hollow, cylindrical tube 52 of the welding rod 50 of FIGS. 6A and 6B may be formed using, for example, a forging process, a casting process, or an extrusion process.

Embodiments of welding rods of the present invention (e.g., the solid welding rod 40 of FIG. 5 and the tubular welding rod 50 of FIGS. 6A and 6B) may be used to apply hardfacing material 10 to a surface of an earth-boring tool using a torch such as, for example, an oxyacetylene torch or an arc-welding torch. The torch is used to heat an end of the welding rod and, optionally, the surface of the earth-boring tool to which the hardfacing material is to be applied. An end of the welding rod is heated until at least the matrix material in the welding rod begins to melt. As the matrix material at the end of the welding rod begins to melt, the melting matrix material, and PCD particles 16 from the welding rod that become entrained within the melting matrix material, are applied to the surface of the earth-boring tool. After application, the molten matrix material is allowed to cool and solidify on the surface of the earth-boring tool, the PCD particles 16 become embedded within the solidified matrix material. The resulting hardfacing material 10 (FIG. 1) includes a continuous matrix phase 14, which is formed by the matrix material of the welding rod, and a discontinuous phase 12 comprising polycrystalline diamond material that is formed by the PCD particles 16 of the welding rod.

Additional embodiments of the present invention include powder feedstock mixtures for use in flame spray processes that include PCD particles 16. For example, a powder feedstock mixture for a flame spray process may comprise a mixture of PCD particles 16, as well as particles of a metal or metal alloy matrix material having a composition as previously described in relation to the matrix phase 14 of the hardfacing material 10 (FIG. 1). The mixture may also comprise additional hard particles that include at least one of a carbide material (e.g., tungsten carbide, titanium carbide, tantalum carbide, silicon carbide, etc.), a boride material (e.g., titanium boride), a nitride material (e.g., silicon nitride), and non-polycrystalline diamond grit. In a flame spray process, such a powder feedstock mixture may be entrained within and carried by a pressurized fluid (e.g., a pressurized gas) to a flame spray nozzle. The pressurized fluid and the powder mixture may be sprayed out from the nozzle and through a flame toward the surface of the earth-boring tool to which the hardfacing material 10 is to be applied. The flame causes the particles of matrix material to at least partially melt. As the powder mixture is sprayed onto the tool, the molten matrix material cools and solidifies, and the PCD particles 16 become embedded within the solidified matrix material. The resulting hardfacing material 10 (FIG. 1) includes a continuous matrix phase 14, which is formed by the particles of matrix material in the powder feedstock mixture, and a discontinuous phase 12 comprising polycrystalline diamond material that is formed by the PCD particles 16 in the powder feedstock mixture.

Additional embodiments of the present invention include earth-boring tools having a hardfacing material 10 (as previously described herein in relation to FIG. 1 and including a discontinuous phase 12 comprising finite spatial volumes of polycrystalline diamond material dispersed within a matrix phase 14) on at least a portion of a surface of a body of the tools. The tools may also include at least one cutting element. By way of example and not limitation, earth-boring tools such as, for example, fixed-cutter rotary drill bits, roller cone rotary drill bits, diamond impregnated rotary drill bits, reamer tools, mills, and coring bits may include hardfacing material 10 and may embody the present invention.

Figure 7:
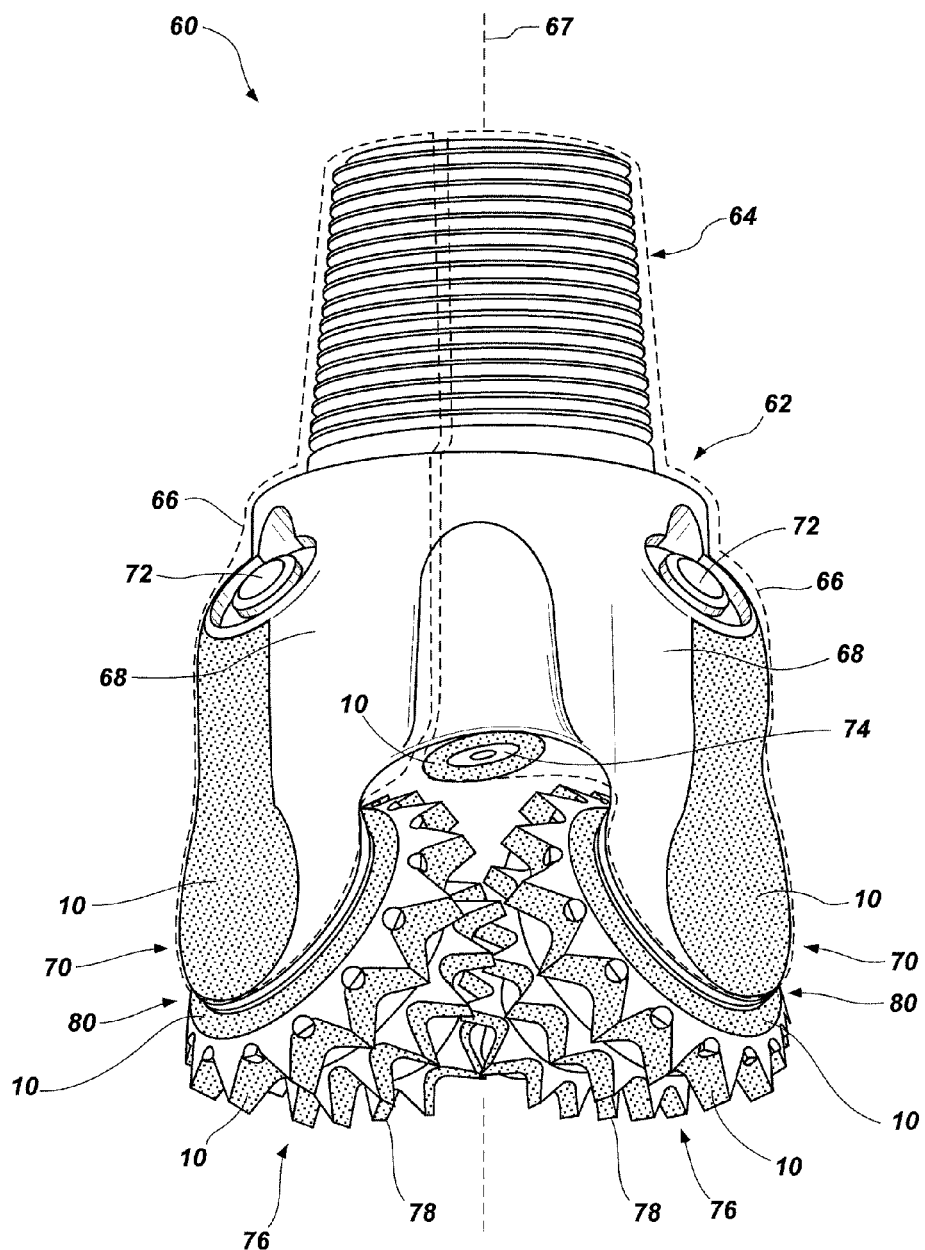
FIG. 7 is a side view of an embodiment of a roller cone earth-boring rotary drill bit of the present invention that includes a hardfacing material like that shown in FIG. 1.

FIG. 7 illustrates an embodiment of a roller cone drill bit 60 of the present invention. The roller cone drill bit 60 includes a bit body 62 having threads 64 at its proximal longitudinal end for connection to a drill string (not shown). The bit body 62 may comprise a plurality (e.g., three) of head sections 66 (which are separated by the dotted lines in FIG. 7) that are welded together concentrically about a longitudinal axis 67 of the drill bit 60. The threads 64 may be machined in the conical shank region of the bit body 62 after welding together the head sections 66. Two of the head sections 66 are visible from the perspective of FIG. 7.

Each head section 66 comprises a head section body or proximal section 68 nearest the threads 64 and a bit leg 70 depending distally therefrom. Each proximal section 68 of the drill bit 60 may include a lubricant fluid pressure compensator 72, as known in the art. At least one nozzle 74 may be provided in the bit body 62 for controlling the direction and velocity of pressurized drilling fluid flowing through the bit body 62 and out from the nozzle 74 during drilling operations. A roller cone cutter 76 is rotatably secured to a bearing shaft (not shown) of each respective bit leg 70 of bit body 62. By way of example, the drill bit 60 has three roller cone cutters 76, one of which is obscured from view from the perspective of FIG. 7. Each roller cone cutter 76 has rows of cutting elements 78. The cutting elements 78 may comprise cutting teeth, which may be machined in exterior surfaces of the bodies of the roller cone cutters 76. Alternatively, the cutting elements 78 may comprise separately formed inserts, which may be formed from a wear-resistant material such as cemented tungsten carbide and pressed into recesses drilled or otherwise formed in exterior surfaces of the bodies of the roller cone cutters 76.

The roller cone drill bit 60 of FIG. 7 may include hardfacing material 10 on one or more surfaces of the drill bit 60. By way of example and not limitation, the outer surfaces of the head sections 66, including exterior surfaces of both the proximal sections 68 of the head sections 66 and the bit legs 70 of the head sections 66 may comprise hardfacing material 10 thereon. Furthermore, hardfacing material 10 may be provided on various surfaces of the roller cone cutters 76. For example, hardfacing material 10 may be provided on gage surfaces 80 of the roller cone cutters 76, on the cutting elements 78 (e.g., on cutting teeth), or on both the gage surfaces 80 and on the cutting elements 78. Hardfacing material 10 also may be applied to surfaces of the drill bit 60 within the fluid passageways (not shown) extending through the drill bit 60, as well as to surfaces of the drill bit 60 proximate the nozzles 74, and other surfaces that might be susceptible to fluid erosion during drilling operations.

Figure 8:
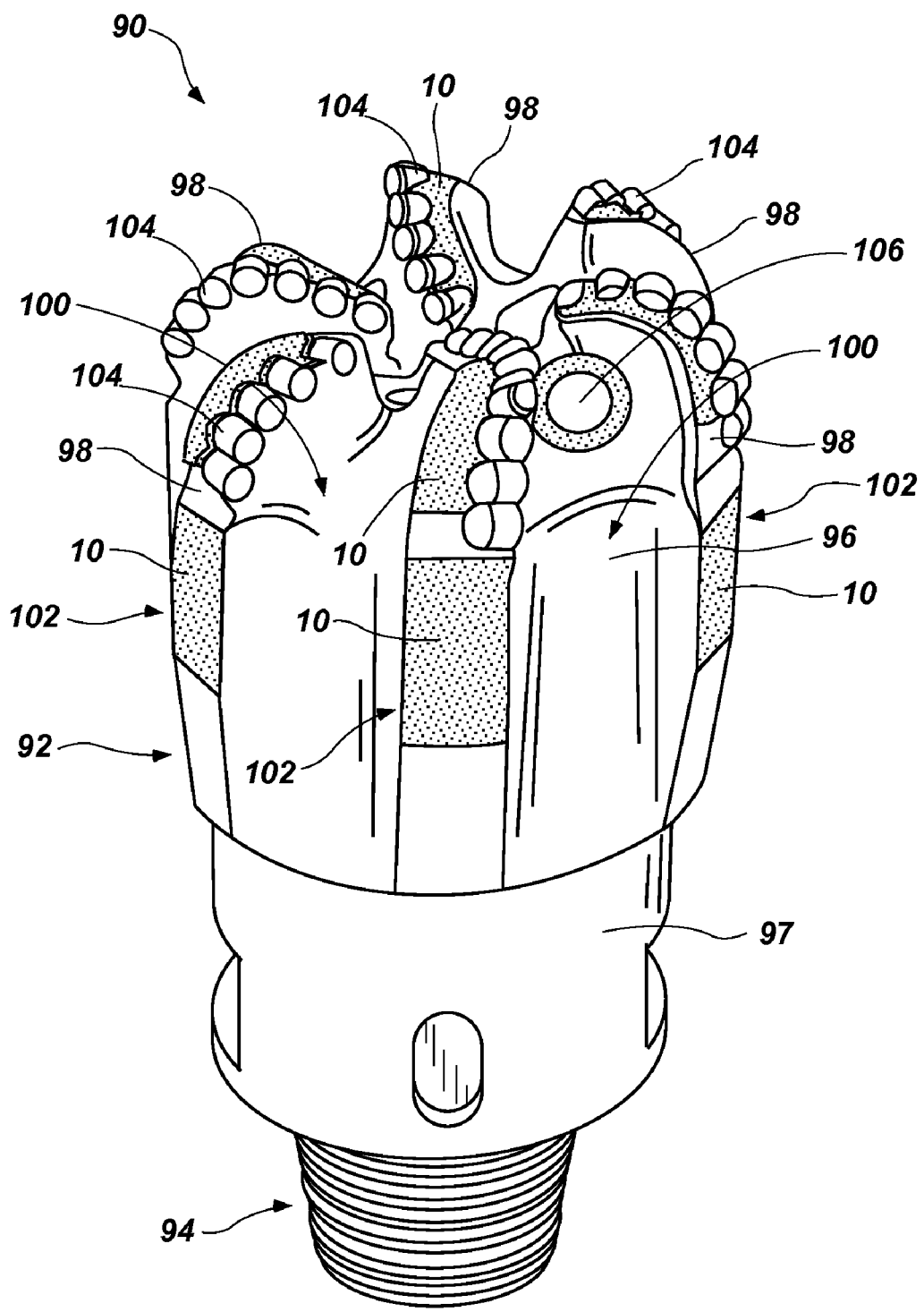
FIG. 8 is a perspective view of an embodiment of a fixed-cutter earth-boring rotary drill bit of the present invention that includes a hardfacing material like that shown in FIG. 1.

FIG. 8 illustrates an embodiment of a fixed-cutter drill bit 90 of the present invention. The fixed-cutter drill bit 90 includes a bit body 92 having threads 94 at its proximal longitudinal end for connection to a drill string (not shown). The bit body 92 may comprise a crown 96, which may be formed from a particle-matrix composite material (e.g., a cemented tungsten carbide material) or a metal alloy (e.g., steel). The crown 96 may be attached to a shank 97, and the threads 94 may be machined in the shank 97.

The crown 96 of the drill bit 90 may comprise a plurality of blades 98 that are separated from one another by fluid passageways 100. The blades 98 may extend over the face of the crown 96 from a central cone region of the crown 96 to a gage region of the crown 96. Radially outer surfaces of the blades 98 in the gage region of the crown 96 comprise gage surfaces 102 of the drill bit 90. These gage surfaces 102 define the diameter of any wellbore drilled by the drill bit 90. The portions of the fluid passageways 100 between the blades 98 in the gage region of the crown 96 are often referred to in the art as "junk slots."

A plurality of cutting elements 104 may be fixedly attached to each of the blades 98. The cutting elements 104 may comprise, for example, PDC cutting elements. Fluid passageways (not shown) also extend through the drill bit 90 to nozzles 106 to allow drilling fluid to be pumped through the drill string (not shown) and the drill bit 90 and out the nozzles 106 during drilling operations.

The fixed-cutter drill bit 90 of FIG. 8 may include hardfacing material 10 on one or more surfaces of the drill bit 90. By way of example and not limitation, the gage surfaces 102 may comprise hardfacing material 10 thereon. Furthermore, hardfacing material 10 may be provided on various formation-engaging surfaces of the blades 98. Hardfacing material 10 also may be applied to surfaces of the drill bit 90 within the fluid passageways (not shown) extending through the drill bit 90, as well as to surfaces of the drill bit 90 proximate the nozzles 106, and other surfaces that might be susceptible to fluid erosion during drilling operations.

Thus, surfaces of earth-boring tools such as, for example, the roller cone drill bit 60 of FIG. 7 and the fixed-cutter drill bit 90 of FIG. 8, may be hardfaced by bonding particles of polycrystalline diamond material, such as the PCD particles 16 of FIGS. 2A-2C, to the surfaces using a matrix material, which may comprise a metal or metal alloy, as previously described herein.

PCD particles 16, as previously described herein, may also be used in other components of earth-boring tools other than hardfacing material to provide wear resistance to the earth-boring tools. As a non-limiting example, PCD particles 16 may be disposed within bit bodies of so-called "diamond-impregnated" rotary drill bits such as those disclosed in, for example, U.S. Pat. No. 6,843,333, which issued Jan. 18, 2005 to Richert et al., the entire disclosure of which is incorporated herein by this reference.

The foregoing description is directed to particular embodiments for the purpose of illustration and explanation. It will be apparent, however, to one skilled in the art that many modifications and changes to the embodiments set forth above are possible without departing from the scope of the embodiments disclosed herein as hereinafter claimed, including legal equivalents. It is intended that the following claims be interpreted to embrace all such modifications and changes.

What is claimed is:

1. A method of forming a hardfacing material, comprising:
   subjecting diamond grains to a temperature greater than about 1,500° C. and a pressure greater than about 5.0 GPa to form diamond-to-diamond bonds between the diamond grains and form a polycrystalline diamond material; and
   breaking down the polycrystalline diamond material to form particles of polycrystalline diamond material, the particles of polycrystalline diamond material comprising a plurality of inter-bonded diamond grains.

2. The method of claim 1, wherein breaking down the polycrystalline diamond material comprises crushing the polycrystalline diamond material.

3. The method of claim 1, further comprising catalyzing formation of the diamond-to-diamond bonds between the diamond grains using a catalyst material.

4. The method of claim 3, further comprising removing the catalyst material from interstitial spaces between the inter-bonded diamond grains within the particles of polycrystalline diamond material.

5. The method of claim 1, further comprising encapsulating the particles of polycrystalline diamond material with an encapsulant material comprising a metal.

6. The method of claim 5, further comprising forming the encapsulant to further comprise at least one of a carbide material, a boride material, a nitride material, and non-polycrystalline diamond grit.

7. The method of claim 1, further comprising embedding the particles of polycrystalline diamond material within a matrix material.

8. The method of claim 7, further comprising forming the matrix material to comprise a metal.

9. The method of claim 8, further comprising forming the matrix material to comprise at least one of a carbide material, a boride material, a nitride material, and non-polycrystalline diamond grit.

10. The method of claim 7, wherein embedding the particles of polycrystalline diamond material within the matrix material comprises embedding the particles of polycrystalline diamond material within the matrix material on a surface of an earth-boring tool.

11. The method of claim 10, wherein embedding the particles of polycrystalline diamond material within the matrix material on the surface of the earth-boring tool comprises embedding the particles of polycrystalline diamond material within the matrix material on a surface of an earth-boring rotary drill bit.

12. The method of claim 10, wherein embedding the particles of polycrystalline diamond material within the matrix material on the surface of the earth-boring tool comprises:
   using a welding torch to at least partially melt the matrix material;
   applying the at least partially molten matrix material and the particles of polycrystalline diamond material to the surface of the earth-boring tool; and
   allowing the at least partially molten matrix material to cool and solidify on the surface of the earth-boring tool.

13. The method of claim 1, wherein subjecting the diamond grains to the temperature greater than about 1,500° C. and the pressure greater than about 5.0 GPa to form diamond-to-diamond bonds between the diamond grains and faun, the polycrystalline diamond material comprises forming a layer of the polycrystalline diamond material.

14. The method of claim 13, wherein breaking down the polycrystalline diamond material to form particles of polycrystalline diamond material comprises forming at least substantially planar fragments of the layer of polycrystalline diamond material.

15. The method of claim 14, further comprising forming the at least substantially planar fragments of the layer of polycrystalline diamond material to have an average particle diameter between about 0.25 millimeter and about 7.0 millimeters, and an average particle thickness between about 0.1 millimeter and about 5.0 millimeters.

* * * * *